(No Model.)

P. HARTMANN.
VESSEL FOR DISPENSING FLUIDS.

No. 308,070. Patented Nov. 18, 1884.

WITNESSES:

INVENTOR:
P. Hartmann
BY Munn & Co
ATTORNEYS.

UNITED STATES PATENT OFFICE.

PETER HARTMANN, OF BROOKLYN, NEW YORK.

VESSEL FOR DISPENSING FLUIDS.

SPECIFICATION forming part of Letters Patent No. 308,070, dated November 18, 1884.

Application filed May 4, 1883. (No model.)

*To all whom it may concern:*

Be it known that I, PETER HARTMANN, of Brooklyn, in the county of Kings and State of New York, have invented certain new and useful Improvements in Vessels for Dispensing Fluids and Protecting their Volatile Principle, of which the following is a full, clear, and exact description.

Figure 1:
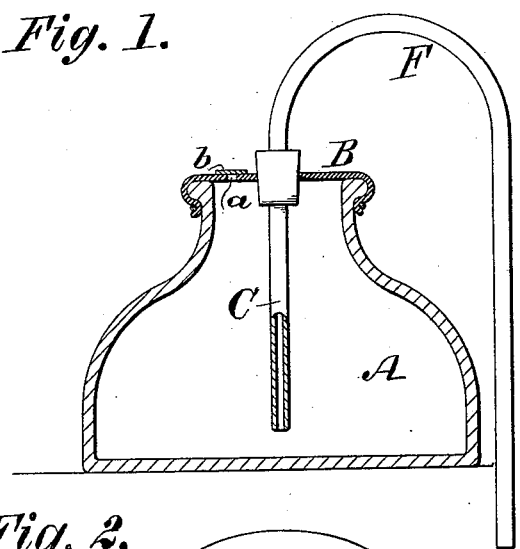
Figure 2:
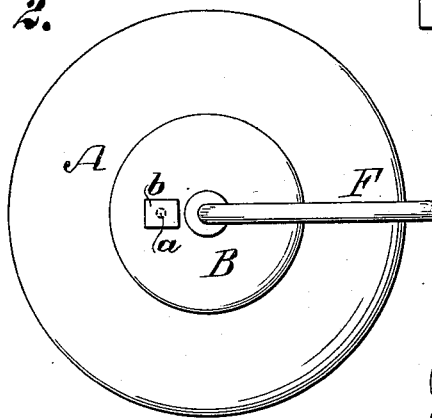
Figure 4:
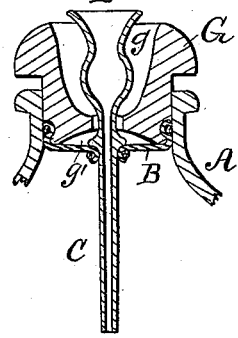
Figure 3:
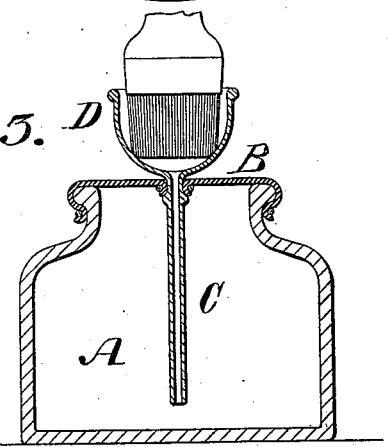

In the drawings, Figure 1 is a sectional elevation showing my invention applied to a bottle from which small quantities are to be drawn. Fig. 2 is a plan view of the same. Fig. 3 is a sectional elevation of a vessel constructed according to my invention for holding liquids to be applied to use with a brush. Fig. 4 is a sectional elevation showing a modification for dispensing liquids to be applied to use with a pen or equivalent instrument.

Referring to Figs. 1 and 2 of the drawings, the vessel A may be of any suitable size and shape. Over the neck of this vessel is placed a thin flexible disk-shaped diaphragm, B, of such material as the nature of the liquid will permit—such as a thin sheet of india-rubber—which is secured air-tight to the vessel, and in the center, and passing through it, is the tube F, the upper end of which is formed to suit the purposes required. This tube is retained at the center of the diaphragm by an enlargement thereon in the form of a wedge-shaped four-sided block.

In Fig. 3 the tube C is secured to the diaphragm by reason of enlargements on such tube above and below the diaphragm forming a neck, in which the diaphragm is inserted. The same enlargement is shown on the tube in Fig. 4. This tube extends down into the bottle, so that the orifice at its lower end will be within and sealed by the contents of the bottle. The diaphragm is secured to the outside of the neck of the vessel A in Figs. 1 and 2 by an elastic band, or it may be secured thereto by other convenient means of attachment; and in this modification such upper end is of a siphon form. Pressure slightly downward upon the siphon and diaphragm will compress the confined air of vessel A and fill the siphon-tube F. To dispense larger quantities, I provide an air-vent, $b$, which is opened after filling the siphon-tube, as above described. The liquid will then continue to flow, and at the same time the volatile principle in the vessel will be protected as only external air is drawn into the vessel to the extent of liquid removed. The vent $b$ will regulate the flow from the siphon, and if shut off will stop the flow.

Fig. 3 has the vessel A, diaphragm B, and the tube C, which opens into an oval cup, D, above diaphragm B. By dipping the brush into this cup a very slight pressure will force up the liquid in contact with the bristles of the brush, the pressure regulating the quantity from a slight moistening of the tip to a full and dripping brush. On withdrawing the brush the superfluous liquid will at once recede to its air-tight vessel, and evaporation can only take place in the small opening of the tube, which is to be as small as possible.

In Fig. 4 is shown a modification in the manner of placing diaphragm B, which, to facilitate refilling the bottle A without disturbing the attached apparatus, I place over the bottom of a stopper, G, in and through which the tube C passes, secured in recesses by elastic bands in the bottom edge of the side of the stopper and ending in a cup, D, in the shape of a ball and funnel, to facilitate the dipping of a pen or equivalent instrument required for dispensing liquids in very small quantities where frequent or almost constant access is required. It will be seen that the diaphragm B is directly over and exposed to the action of the liquid when its nature will permit, and the stopper G is recessed at $g$ to guard cup D from injury, and at $g'$ to permit movement of the diaphragm B.

Volatile varnishes are at present used by pouring small quantities in a cup to dip the brush. They are thus exposed to evaporation and great loss of their volatile principle— namely, the solvent of the gum.

It will be seen that by my invention, Fig. 3, the varnish is confined air-tight, and is pressed up and in contact with the point of a brush to the extent required, and on withdrawing the brush the varnish immediately recedes and is protected. Inks used by draftsmen, writing-fluids, &c., that require constant exposure to give access to dip their instruments, are deteriorated by evaporation, and a large percentage of them thus go to waste. By my construction, as shown in Fig. 4, this is avoided, as the liquid is at all times protected, and by the dip of the instrument in the cup the solution required is brought into contact with such an instrument and at once recedes when the pen or instrument is withdrawn, and the ink is protected and requires no further attention. Imperfect adjustment is easily detected by pressing and holding steady the cup D. If the liquid recedes, air is escaping; if it remains stationary, it is air tight. By so constructing the diaphragm the confined air expanding will lift it and not force the liquid to exposure or cause it to overrun the aperture of the tube and overflow the sides of the bottle.

I do not claim the method of compressing air over a liquid to force said liquid up through a tube passing through an air-chamber and into the liquid and lifting the liquid, as by compression.

I claim—

The vessel A, the mouth of which is closed air-tight by the thin flexible disk-shaped diaphragm B, in combination with the tube C, fitted air-tight into and passing through said diaphragm and down into the vessel, so that the orifice at its lower end will be sealed by the contents of the bottle, substantially as and for the purposes set forth.

PETER HARTMANN.

Witnesses:
 H. A. WEST,
 C. SEDGWICK.